United States Patent
Asaoka (10) Patent No.: US 10,189,402 B2
(45) Date of Patent: Jan. 29, 2019

(54) ILLUMINATION APPARATUS FOR VEHICLE

(71) Applicant: TOYOTA JIDOSHA KABUSHIKI KAISHA, Toyota-shi, Aichi (JP)

(72) Inventor: Kazuya Asaoka, Seto (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 3 days.

(21) Appl. No.: 15/317,176

(22) PCT Filed: May 29, 2015

(86) PCT No.: PCT/JP2015/065526
§ 371 (c)(1),
(2) Date: Dec. 8, 2016

(87) PCT Pub. No.: WO2015/194345
PCT Pub. Date: Dec. 23, 2015

(65) Prior Publication Data
US 2017/0113604 A1    Apr. 27, 2017

(30) Foreign Application Priority Data
Jun. 19, 2014   (JP) ................. 2014-126521

(51) Int. Cl.
*B60Q 1/34*      (2006.01)
*B60W 30/09*     (2012.01)
(Continued)

(52) U.S. Cl.
CPC ............. *B60Q 1/346* (2013.01); *B60Q 1/122* (2013.01); *B60Q 1/34* (2013.01); *B60Q 1/44* (2013.01);
(Continued)

(58) Field of Classification Search
CPC . B60Q 1/08; B60Q 1/085; B60Q 1/12; B60Q 1/122; B60Q 1/50; B60Q 1/503;
(Continued)

(56) References Cited

U.S. PATENT DOCUMENTS

| 7,233,311 B2 * | 6/2007 | Okubo | B60Q 1/085 345/108 |
| 2003/0146827 A1 * | 8/2003 | Koike | B60Q 1/484 340/435 |

(Continued)

FOREIGN PATENT DOCUMENTS

| DE | 10034381 A1 * | 1/2002 | ............. B60Q 11/00 |
| DE | 10 2011 081 396 A1 | 2/2013 | |

(Continued)

OTHER PUBLICATIONS

EPO machine translation of SU 1277172 (original SU document published Dec. 15, 1986) (Year: 1986).*

(Continued)

*Primary Examiner* — Behrang Badii
*Assistant Examiner* — David A Testardi
(74) *Attorney, Agent, or Firm* — Finnegan, Henderson, Farabow, Garrett & Dunner, LLP (57) ABSTRACT

An illumination apparatus for a vehicle includes a projector configured to project an image of visible light; and a processing apparatus configured to predict a travel area of the vehicle after a predetermined time or a predetermined distance of travel, and project an image in the predicted travel area with the projector for illumination of the travel area, the image being indicative of a travel state of the vehicle or a control state of the vehicle.

3 Claims, 12 Drawing Sheets

(51) Int. Cl.
*B60Q 1/44* (2006.01)
*B60Q 1/46* (2006.01)
*B60Q 1/12* (2006.01)

(52) U.S. Cl.
CPC .............. *B60Q 1/46* (2013.01); *B60W 30/09* (2013.01); *B60Q 2300/114* (2013.01); *B60Q 2300/122* (2013.01); *B60Q 2400/50* (2013.01); *B60Y 2306/01* (2013.01)

(58) Field of Classification Search
CPC .......... B60Q 2300/10; B60Q 2300/114; B60Q 1/346; B60Q 1/44; B60Q 2400/50; B60Q 1/46; B60W 30/09
See application file for complete search history.

(56) References Cited

U.S. PATENT DOCUMENTS

| | | | |
|---|---|---|---|
| 2006/0125616 A1 | 6/2006 | Song | |
| 2008/0129544 A1* | 6/2008 | Augst | B62D 15/027 340/932.2 |
| 2008/0198372 A1* | 8/2008 | Pan | B60Q 1/38 356/121 |
| 2010/0017111 A1* | 1/2010 | Stefani | B60Q 1/50 701/533 |
| 2012/0044090 A1* | 2/2012 | Kahler | B60Q 1/50 340/905 |
| 2013/0090803 A1* | 4/2013 | Stahlin | G06K 9/6289 701/30.3 |
| 2013/0120572 A1 | 5/2013 | Kwon | |
| 2013/0279186 A1* | 10/2013 | Okamoto | B60Q 1/085 362/466 |
| 2014/0028980 A1* | 1/2014 | Othmer | B60Q 1/50 353/14 |
| 2014/0214260 A1* | 7/2014 | Eckert | B60Q 1/488 701/28 |
| 2014/0267415 A1* | 9/2014 | Tang | G06T 11/60 345/633 |
| 2015/0066284 A1* | 3/2015 | Yopp | B60W 30/00 701/29.2 |
| 2015/0149021 A1* | 5/2015 | Duncan | A61B 5/18 701/23 |
| 2015/0203023 A1* | 7/2015 | Marti | B60Q 1/00 340/425.5 |
| 2015/0224926 A1* | 8/2015 | Mochizuki | B60R 1/00 701/36 |
| 2015/0228195 A1* | 8/2015 | Beaurepaire | G08G 1/0962 340/907 |
| 2015/0254515 A1* | 9/2015 | Zobel | G06K 9/00798 382/104 |
| 2015/0336502 A1* | 11/2015 | Hillis | B60Q 1/26 701/23 |
| 2016/0200317 A1* | 7/2016 | Danzl | B60K 28/06 701/25 |
| 2017/0144584 A1* | 5/2017 | Asaoka | B60Q 1/0023 |

FOREIGN PATENT DOCUMENTS

| | | |
|---|---|---|
| DE | 102011081396 A1 * | 2/2013 |
| DE | 10 2011 119 923 A1 | 5/2013 |
| EP | 1916154 A1 | 4/2008 |
| FR | 2967625 A1 * | 5/2012 |
| JP | 2004-9829 | 1/2004 |
| JP | 2008-143505 A | 6/2008 |
| JP | 2008-174192 | 7/2008 |
| JP | 2009-1164 | 1/2009 |
| JP | 2013-103628 | 5/2013 |
| JP | 2013-125433 | 6/2013 |
| JP | 2014013524 A * | 1/2014 |
| JP | 2014-058173 A | 4/2014 |
| JP | 2015-153057 A * | 8/2015 |
| SU | 1277172 A1 * | 12/1986 |
| WO | WO 2013/034142 A1 | 3/2013 |
| WO | WO 2014/009130 A1 | 1/2014 |

OTHER PUBLICATIONS

EPO machine translation of FR 2967625 (original FR document published May 25, 2012) (Year: 2012).*
EPO machine translation of DE 102011081396 (original DE document published Feb. 28, 2013) (Year: 2013).*
JPO machine translation of JP 2015-153057 (original JP document published Aug. 24, 2015) (Year: 2015).*
Office Action issued in U.S. Appl. No. 15/318,629 dated Apr. 11, 2018.
Notice of Allowance issued in U.S. Appl. No. 15/316,629 dated Aug. 15, 2018.
Notice of Allowance issued in U.S. Appl. No. 15/316,629 dated Nov. 15, 2018.

* cited by examiner

ILLUMINATION APPARATUS FOR VEHICLE

CROSS-REFERENCE TO RELATED APPLICATIONS

This application is a national phase application of International Application No. PCT/JP2015/065526, filed May 29, 2015, and claims the priority of Japanese Application No. 2014-126521, filed Jun. 19, 2014, the content of both of which is incorporated herein by reference.

TECHNICAL FIELD

The disclosure is related to an illumination apparatus for a vehicle.

BACKGROUND ART

A road surface rendering apparatus is known (see Patent Document 1, for example) in which a travel area of a vehicle after a predetermined time is predicted and visible light is radiated to an area corresponding to the predicted travel area.

CITATION LIST

[Patent Document 1] Japanese Laid-open Patent Publication No. 2013-103628

SUMMARY

Technical Problem

However, according to the configuration disclosed in Patent Document 1, the illumination state does not change according to a travel state of the vehicle or a control state of the vehicle. Thus, there is an aspect that a driver cannot obtain useful information because the travel state of the vehicle or the control state of the vehicle cannot be recognized from the outside.

It is an object of the present disclosure to provide an illumination apparatus for a vehicle which is capable of projecting an image indicative of a travel state of a vehicle or a control state of the vehicle.

Solution to Problem

According to an aspect of the disclosure, an illumination apparatus for a vehicle is provided, and the illumination apparatus includes: a projector configured to project an image of visible light; and a processing apparatus configured to predict a travel area of the vehicle after a predetermined time or a predetermined distance of travel, and project an image in the predicted travel area with the projector for illumination of the travel area, the image being indicative of a travel state of the vehicle or a control state of the vehicle.

Advantageous Effects of Invention

According to the disclosure, it becomes possible to obtain an illumination apparatus for a vehicle which is capable of projecting an image indicative of a travel state of a vehicle or a control state of the vehicle.

DESCRIPTION OF EMBODIMENTS

In the following, embodiments are described in detail with reference to appended drawings.

Figure 1:
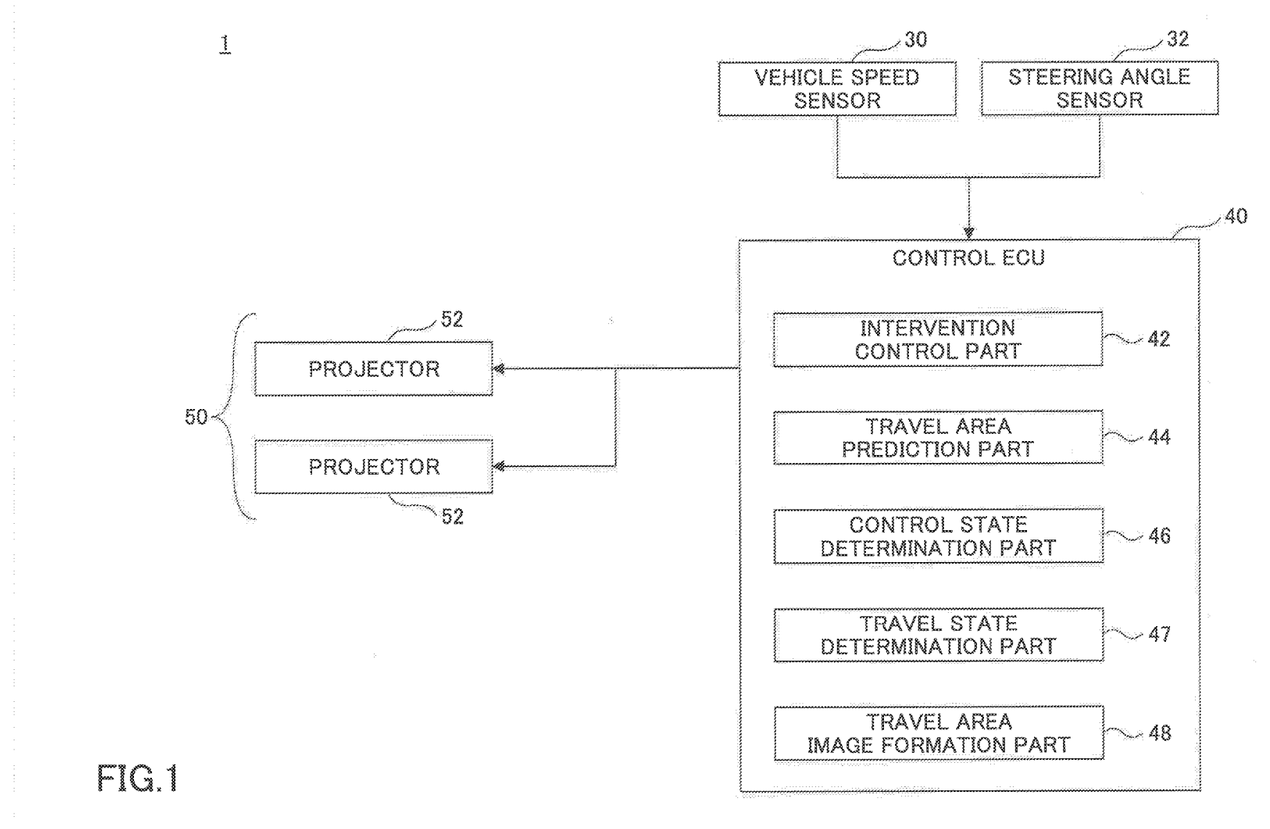
FIG. 1 is a diagram illustrating a configuration of an illumination apparatus 1 for a vehicle according to an embodiment.

FIG. 1 is a diagram illustrating a configuration of an illumination apparatus 1 for a vehicle according to an embodiment. The lighting apparatus 1 for a vehicle includes a vehicle speed sensor 30, a steering sensor 32, a control ECU (Electronic Control unit) 40, and headlamps 50, as illustrated in FIG. 1.

The vehicle speed sensor 30 outputs an electric signal according to rotation speed of vehicle wheels (vehicle speed pulses) to the control ECU 40. The steering sensor 32 outputs an electric signal according to a steering angle to the control ECU 40.

The control ECU 40 mainly includes a microprocessor that includes a CPU, a ROM, a RAM, etc., which are interconnected via buses (not shown). The control ECU 40 includes an intervention control part 42, a travel area prediction part 44, a control state determination part 46, a travel state determination part 47, and a travel area image formation part 48. The parts 42, 44, 46, 47, and 48 may be implemented by the CPU executing programs stored in a storage device such as ROM. Further, the parts 42, 44, 46, 47, and 48 are not necessarily incorporated in the same ECU unit and thus may be implemented by several ECUs in cooperation. Further, the travel state determination part 47 is optional, as described hereinafter, and thus may be omitted.

The intervention control part 42 performs an intervention control. The intervention control is to be performed regardless of a driver operation or a driver intention, and has an influence on a travel state of the vehicle. Typically, the intervention control includes at least one of an autonomous brake control, an autonomous steering control, and an autonomous vehicle speed control.

The autonomous brake control is performed to prevent a collision or reduce damage at the time of the collision. The autonomous brake control is a pre-crash safety control, for example. According to the pre-crash safety control, when TTC (Time to Collision) becomes less than or equal to a predetermined value, a braking force is generated with a brake actuator (not illustrated). The autonomous brake control may be performed in more than two steps such a preliminary braking and a primary braking.

The autonomous steering control is performed to avoid a departure from a lane. For example, the autonomous steering control may be a LKA (Lane Keeping Assist) that supports a driver's steering operation such that the vehicle travels to keep the traveling lane, or a LDW (Lane Departure Warning) that is operated when the departure from the traveling lane is detected or the like. According to the LKA, the steering torque is constantly assisted according to the lateral displacement with respect to the target traveling line (traveling lane center), the yaw angle, etc., and, when the departure tendency is detected, the departure reduction with the steering torque is performed. According to the LDW, when the departure tendency is detected, the departure reduction with the steering torque is performed. It is noted that at the time of performing the autonomous steering control the steering torque and a yaw moment with a brake actuator (not illustrated) may be generated or only one of them may be generated.

The autonomous vehicle speed control is performed to maintain vehicle speed or to follow a preceding vehicle, etc. The autonomous vehicle speed control may be a constant vehicle speed control, a low and high vehicle speed ACC (Adaptive Cruise Control), an ACC for a particular vehicle speed range, an ASL (Adjustable Speed Limiter), an ISA (Intelligent Speed Assistance), or the like, a for example. It is noted that, according to ASL, a driving force is controlled such that the vehicle speed does not exceed a set vehicle speed that is set by the driver. According to ISA, the set vehicle speed is automatically set based on limit speed information of road signs, etc.

Figure 2:
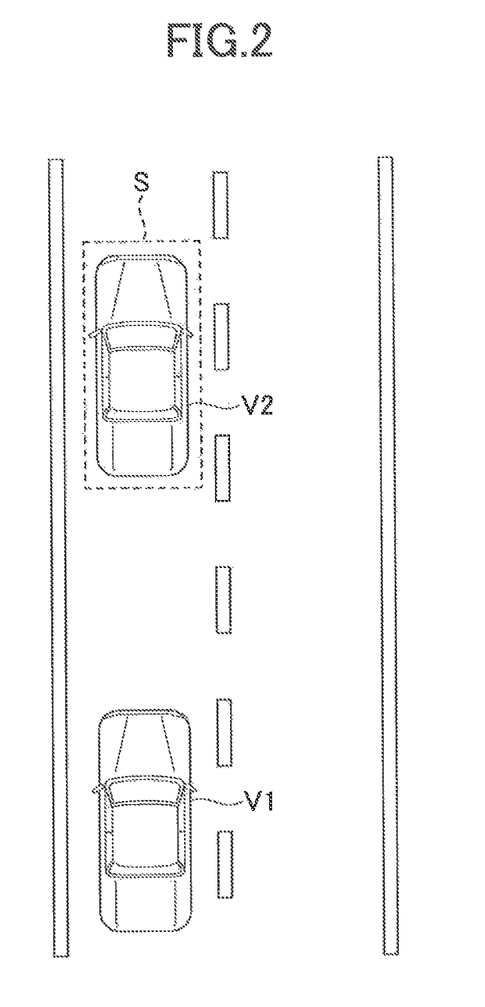
FIG. 2 is a diagram explaining a travel area.

The travel area prediction part 44 predicts a travel area of the vehicle after a predetermined time $\Delta T1$ or a travel, of predetermined distance D1 (represented by "after the predetermined time $\Delta T1$", hereinafter). A way of predicting the travel area after the predetermined time or the predetermined distance of travel is arbitrary. For example, the travel area prediction part 44 may predict, based on vehicle speed information from the vehicle speed sensor 30 and steering information from the steering sensor 32, the travel area after the predetermined time $\Delta T1$. The predetermined distance D1 may be varied according to the vehicle speed such that the predetermined distance D1 becomes greater as the vehicle speed becomes higher, or may be a fixed value. It is noted that the predetermined time $\Delta T1$ is arbitrary; however, the predetermined time $\Delta T1$ may be set based on a value of TTC at which a collision prevention function (an automatic brake control, etc.) is to be operated, for example. For example, the predetermined time $\Delta T1$ may be the same as the value of TTC at which a collision prevention function is to be operated, or slightly longer than it. In FIG. 2, the travel area S on the road is schematically illustrated in a plan view. In the example illustrated in FIG. 2, the travel area S is generated based on a vehicle outline at a vehicle position V2 after the predetermined time $\Delta T1$ with respect to the current vehicle position V1. The travel area S may circumscribe the vehicle outline at the vehicle position V2 with or without a predetermined margin. However, the travel area S may be only a part of the vehicle outline (a front portion, for example) at the vehicle position V2. Further, in the example illustrated in FIG. 2, a direction of the travel area S is constant; however, if the direction of the vehicle after the predetermined time $\Delta T1$ will change, the direction of the travel area S may be changed accordingly.

The control state determination part 46 determines a control state by the intervention control part 42. The control state may include on/off state of the intervention control, and a control state of the intervention control (an intervention amount, an intervention way, etc.) by the intervention control part 42. It is noted that the on/off state of the intervention control may be switchable by the driver via an arbitrary interface (a switch, for example). Alternatively, the intervention control may be in an on state at any time or upon a predetermined condition being met, regardless of the intention of the driver. It is noted that, in general, the autonomous vehicle speed control and the autonomous steering control are related to convenience, and thus the on/off state thereof can be changed by the driver. On the other hand, the autonomous brake control is related to safety, and thus is in the on state any time. It is noted that the on state indicates a state in which the control is to be performed when a control execution condition is met. Thus, even in the on state, there may a state in which the intervention control is not performed.

The travel state determination part 47 determines a travel state of the vehicle. The travel state of the vehicle includes an acceleration state, a constant vehicle speed state, and a deceleration state. In this case, the travel state determination part 47 may determine the travel state of the vehicle based on the vehicle speed, an accelerator operation amount, a brake operation amount, etc. Further, the travel state of the vehicle may include a right turning state, a left turning state, and a straight traveling state. In this case, the travel state determination part 47 may determine the travel state of the vehicle based on the steering angle, a lateral, acceleration, etc.

The travel area image formation part 48 determines an image to be projected on the travel area predicted by the travel area prediction part 44. The travel area image formation part 48 controls projectors 52 of the head lamps 50 such that the determined image is projected on the travel area. The image is described hereinafter.

The headlamps 50 are provided on either left or right side of the front portion of the vehicle. The head light 50 emits visible light toward the forward scene. The head lamps 50 can render the image of visible light on a road surface. For this purpose, the head lamps 50 include a projector (projecting apparatus) 52 that is capable of projecting the image, for example. The projectors 52 may be provided in either left or right head lamp 50. The projectors 52 may be implemented by high beam lamps (additional high beam lamps other than high/low combination units, for example) in either left or right head lamp 50. The projectors 52 have a 3-dimensional rendering function based on Projection Mapping technique such that the image is superimposed on the road surface or the obstacle on the road surface. Further, the projectors 52 may be capable of emitting the visible light other than white color to enable the rendering on the road surface in the daytime.

Figure 3:
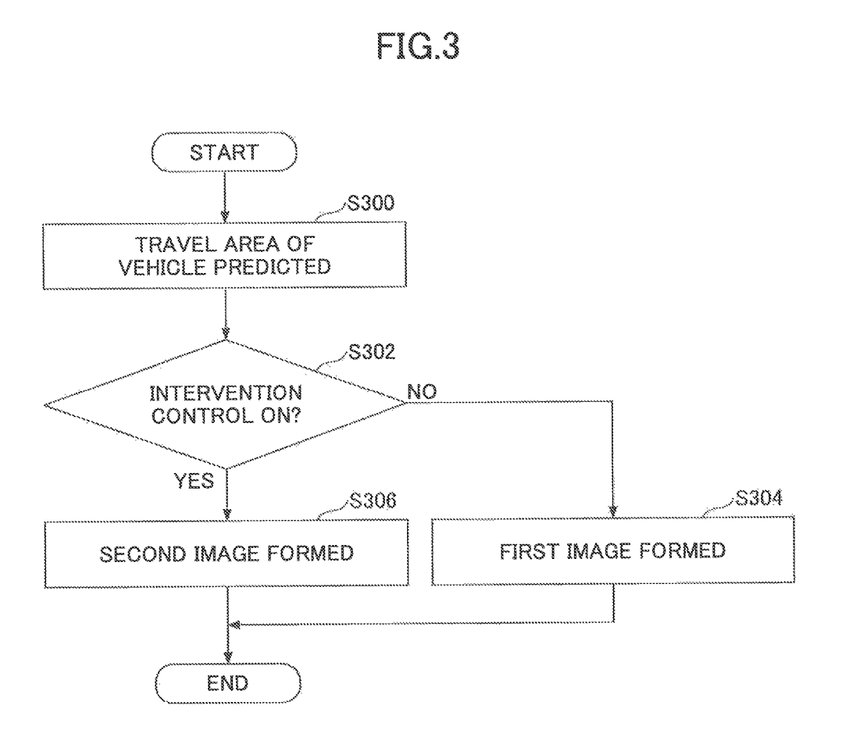
FIG. 3 is a flowchart of an example of a process executed by a control ECU 40.

FIG. 3 is a flowchart of an example of a process executed by the control ECU 40. The process illustrated in FIG. 3 may be initiated when an ignition switch of the vehicle is turned on, and then may be repeated at a predetermined cycle.

Further, the process illustrated in FIG. 3 may be initiated under a condition that the head lamps 50 have been turned on.

In step S300, the travel area prediction part 44 predicts the travel area of the vehicle after the predetermined time ΔT1.

In step S302, the control state determination part 46 determines whether the intervention control is in the on state. Here, as an example, the control state determination part 46 determines whether the autonomous vehicle speed control and the autonomous steering control are in the on states. If it is determined that any one of the autonomous vehicle speed control and the autonomous steering control is in the on state, the process routine goes to step 306, otherwise the process routine goes to step 304.

Figure 4:
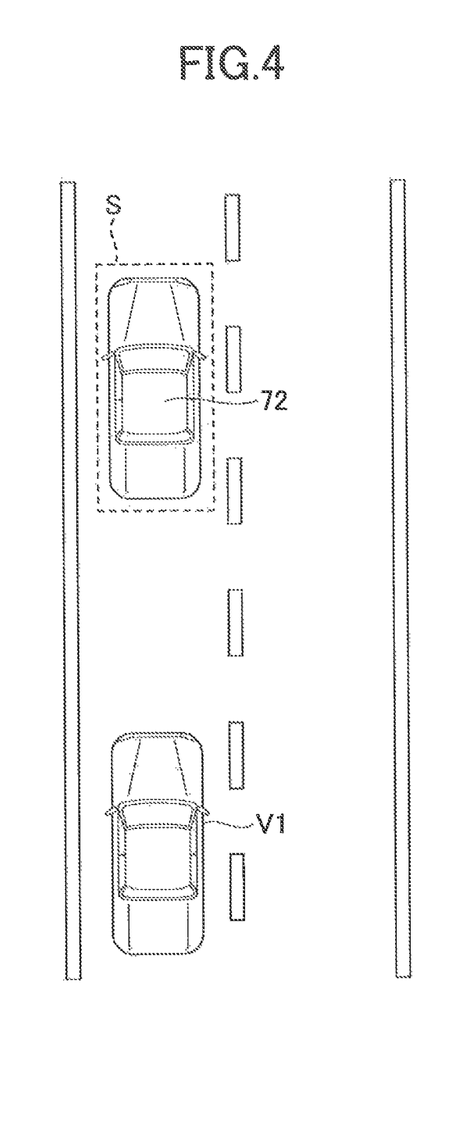
FIG. 4 is a diagram explaining a first image.

In step S304, the travel area image formation part 48 forms (renders) a first image, and projects the formed first image in the travel area with the projectors 52. The first image is arbitrary; however, the first image may be an image that merely brightens the travel area S as a whole as illustrated in FIG. 4, for example. Alternatively, the first image may be an image 72 of a silhouette of the vehicle rendered in the travel area S as illustrated in FIG. 4, for example. It is noted that lines of such a silhouette may be formed with a shade (i.e., a part in which the light is not illuminated, or a part in which the illumination strength is lower than that of a neighboring area).

In step S306, the travel area image formation part 48 forms (renders) a second image, and projects the formed second image in the travel area with the projectors 52. The second image is indicative of the intervention control in the on state, and may be arbitrary as long as the second image is different from the first image. The difference between the second image and the first image may be brightness or color, and/or the presence or absence of flashing (the second image flashes while the first image does not flash, for example). Alternatively, the second image may be formed by superimposing a predetermined image on the first image. The predetermined image may be a character(s) indicative of "intervention control being in the on state".

According to the process illustrated in FIG. 3, the image indicative of the control state of the vehicle (the on/off state of the intervention control) can be projected. With this arrangement, the driver distinguishes the image projected ahead between the first image and the second image to be able to recognize the on/off state of the intervention control while keeping a line of sight ahead. In other words, the driver can recognize the on/off state of the intervention control while monitoring a situation (the presence or absence of the obstacle, for example) in the travel area illuminated by the first image or the second image. Further, drivers of surrounding vehicles, pedestrians, etc., who see the projected image can also recognize the on/off state of the intervention control.

Figure 5:
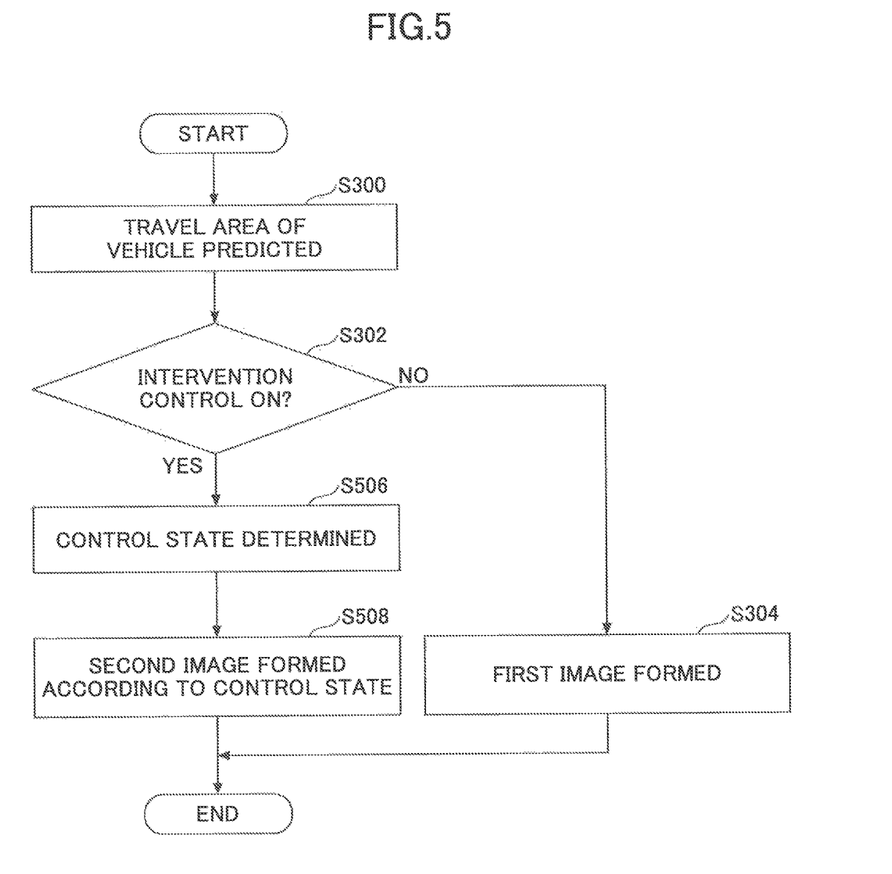
FIG. 5 is a flowchart of another example of a process executed by a control ECU 40.

FIG. 5 is another example of a flowchart of the process executed by the vehicle control ECU 40. The process illustrated in FIG. 5 may be initiated when an ignition switch of the vehicle is turned on, and then may be repeated at a predetermined cycle. Further, the process illustrated in FIG. 5 may be initiated under a condition that the head lamps 50 have been turned on.

The process illustrated in FIG. 5 differs from the process illustrated in FIG. 3 in that processes of step S506 and step S508 are performed instead of the process of step S306. In the following, only a different part is mainly described.

The control state determination part 46 determines the control state by the intervention control part 42. The control state by the intervention control part 42 is merely whether the intervention control is being performed. Alternatively, the control state by the intervention control part 42 may include an execution state during the execution of the intervention control. The execution state of the intervention control differs according to the types of the intervention controls. For example, if the intervention control is the autonomous vehicle speed control, the control state may include an acceleration control, a deceleration control, a constant speed travel control, etc. Further, if the intervention is the autonomous steering control, the control state may include a steering control in a right direction with the intervention amount greater than or equal to a predetermined value, a steering control in a left direction with the intervention amount greater than or equal to the predetermined value, a steering control with the intervention amount less than the predetermined value, etc. The predetermined value is arbitrary, but may correspond to a lower limit value of the intervention amount at which the driver can sense the intervention, for example.

In step S508, the travel area image formation part 48 forms (renders) the second image according to the control state of the intervention control, and projects the formed second image in the travel area with the projectors 52. The second image according to the control state of the intervention control is arbitrary as long as it is different from the first image and varied according to the control state of the intervention control. Examples of the second image according to the control state of the intervention control are described herein after.

According to the process illustrated in FIG. 5, the image indicative of the control state of the vehicle (the control state of the intervention control) can be projected. With this arrangement, the driver can recognize the control state of the intervention control while keeping the line of sight ahead. Further, drivers of surrounding vehicles, pedestrians, etc., who see the projected image can also recognize the control state of the intervention control.

It is noted that the process of step S304 may be omitted, in the process routine illustrated in FIG. 5. Such a variant is suited for the case where the head lamps 50 are in the off state, for example.

Figure 6A:
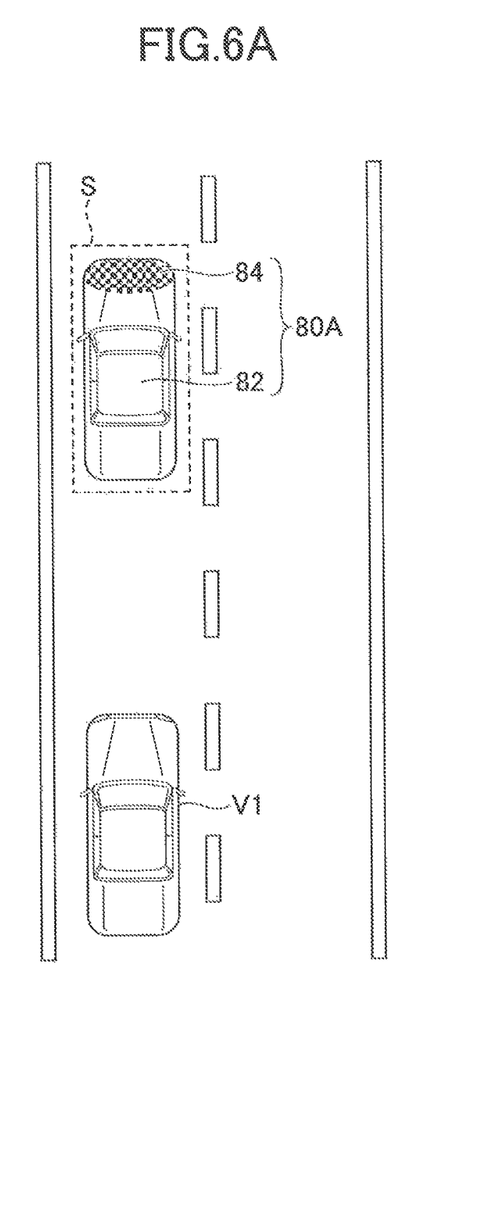
FIG. 6A is a diagram illustrating an example of a second image according to a control state of an intervention control in the case where the intervention control is an autonomous vehicle speed control.
Figure 6B:
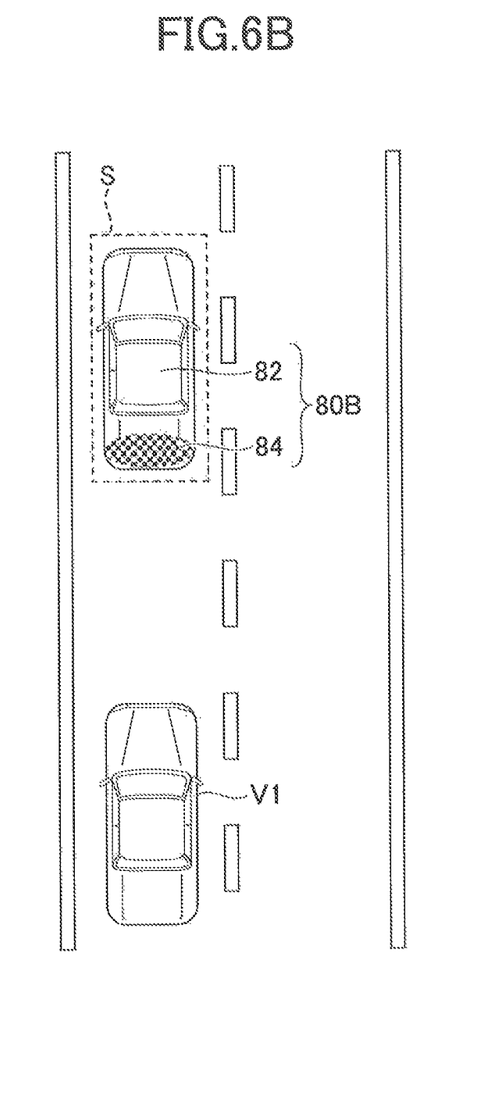
FIG. 6B is a diagram illustrating an example of a second image according to a control state of an intervention control in the case where the intervention control is an autonomous vehicle speed control.
Figure 6C:
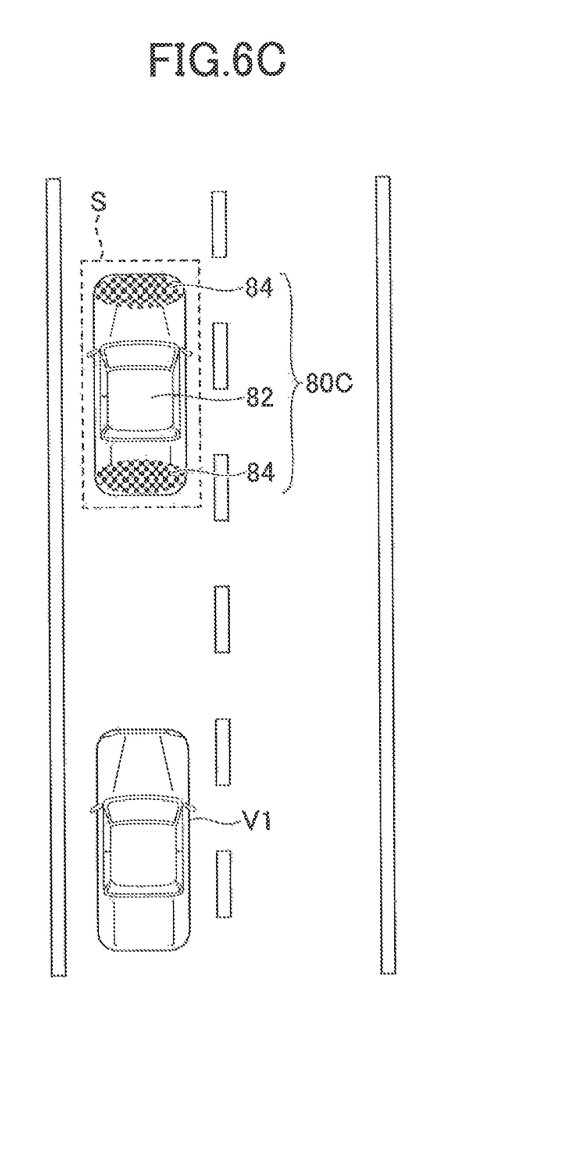
FIG. 6C is a diagram illustrating an example of a second image according to a control state of an intervention control in the case where the intervention control is an autonomous vehicle speed control.

FIGS. 6A through 6C are diagrams illustrating an example of the second image according to the control state of the intervention control in the case where the intervention control is the autonomous vehicle speed control.

The travel area image formation part 48 forms a second image BOA as illustrated in FIG. 6A when the control state is the acceleration control. In the example illustrated in FIG. 6A, the second image 80A includes a silhouette portion 82 and a featuring portion 84. The silhouette portion 82 forms the silhouette of the vehicle, like the image 72 illustrated in FIG. 4. The featuring portion 84 forms a checkered pattern that alternately includes dark portions and bright portions in a plurality of rows in a front and rear direction and a left and right direction. It is noted that dark portions of the checkered pattern may be formed with shades (i.e., parts in which the light is not illuminated, or parts in which the illumination strength is lower than that of a neighboring area). The featuring portion 84 extends in the left and right direction such that the featuring portion 84 is superimposed on a front end portion of the silhouette portion 82, as illustrated in FIG. 6A. The featuring portion 84 is formed to have more than two rows in the front and rear direction. The featuring portion 84 may be formed such that flashing is repeated on a row basis successively from the front row to the rearmost row. At that time, the travel area image formation part 48 may change flashing speed such that the flashing speed increases as the acceleration becomes greater. It is noted that the silhouette portion 82 is not flashed.

The travel area image formation part 48 forms a second image SOB as illustrated in FIG. 6B when the control state is the deceleration control. In the example illustrated in FIG. 6B, the featuring portion 84 extends in the left and right direction such that the featuring portion 84 is superimposed on a rear end portion of the silhouette portion 82. The featuring portion 84 is formed to have more than two rows in the front and rear direction. The featuring portion 84 may be formed such that flashing is repeated on a row basis successively from the rearmost row to the front row. At that time, the travel area image formation part 48 may change flashing speed such that the flashing speed increases as the deceleration becomes greater. It is noted that the silhouette portion 82 is not flashed.

The travel area image formation part 48 forms a second image 80C as illustrated in FIG. 6C when the control state is the constant speed travel control (inertia travel state). In the example illustrated in FIG. 6C, the featuring portions 84 extend in the left and right direction such that the featuring portions 84 are superimposed on the front end portion and the rear end portion of the silhouette portion 82, respectively. The featuring portions 84 on the front and the rear may be flashed simultaneously or may not be flashed. It is noted that the silhouette portion 82 is not flashed.

The travel area image formation part 48 forms the second image 80B as illustrated in FIG. 6B when the control state is the deceleration control for emergency stop. However, in this case, the travel area image formation part 48 simultaneously flashes the featuring portion 84 (the rows thereof simultaneously) at the speed higher than that in the constant speed travel control (double, for example). It is noted that if the intervention control is the autonomous brake control, the travel area image formation part 16 may form the second image 80B during the operation of the autonomous brake. Specifically, the travel area image formation part 48 may simultaneously flash the featuring portion 84 (the rows thereof simultaneously) at the increased speed. At that time, the silhouette portion 82 is not flashed, but may be flashed.

It is noted that in the example illustrated in FIGS. 6A through 6C, when the control state is the acceleration control, the featuring portion 84 is not superimposed on the rear end portion of the silhouette portion 82; however, the featuring portions 84 may be superimposed on the front and rear end portions of the silhouette portion 82, respectively. In this case, the travel area image formation part 48 flashes only the featuring portion 84 on the front end portion of the silhouette portion 82 when the control state is the acceleration control. Similarly, in the example illustrated in FIGS. 6A through 6C, when the control state is the deceleration control, the featuring portion 84 is not superimposed on the front end portion of the silhouette portion 82; however, the featuring portions 84 may be superimposed on the front and rear end portions of the silhouette portion 82, respectively. In this case, the travel area image formation part 48 flashes only the featuring portion 84 on the rear end portion of the silhouette portion 82 when the control state is the deceleration control.

Figure 7A:
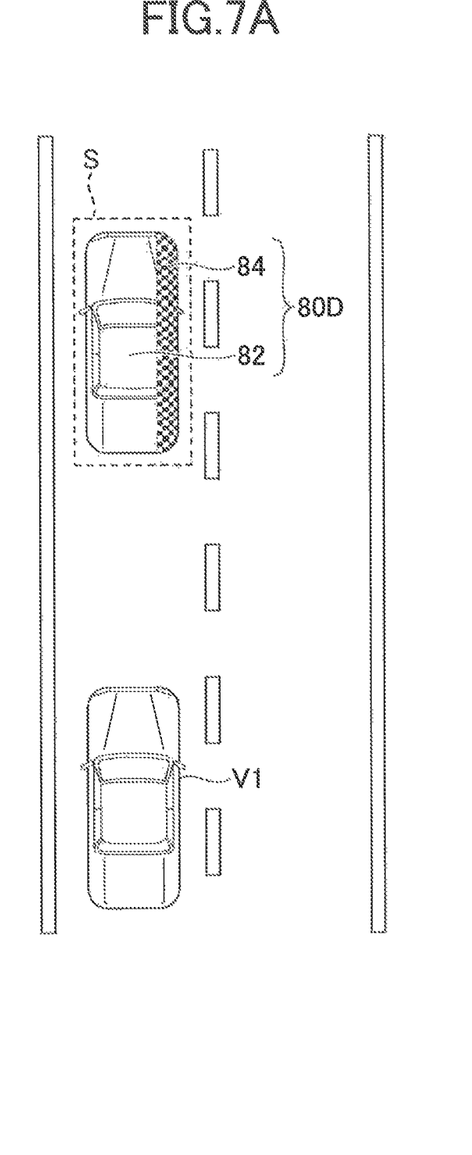
FIG. 7A is a diagram illustrating an example of a second image according to a control state of an intervention control in the case where the intervention control is an autonomous steering control.
Figure 7B:
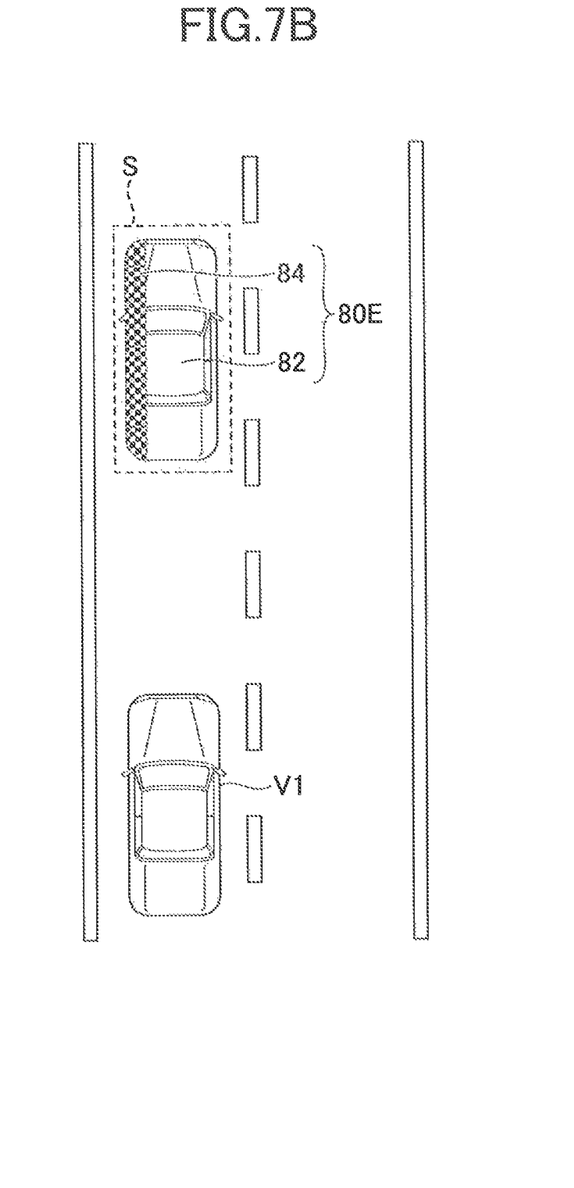
FIG. 7B is a diagram illustrating an example of a second image according to a control state of an intervention control in the case where the intervention control is an autonomous steering control.
Figure 7C:
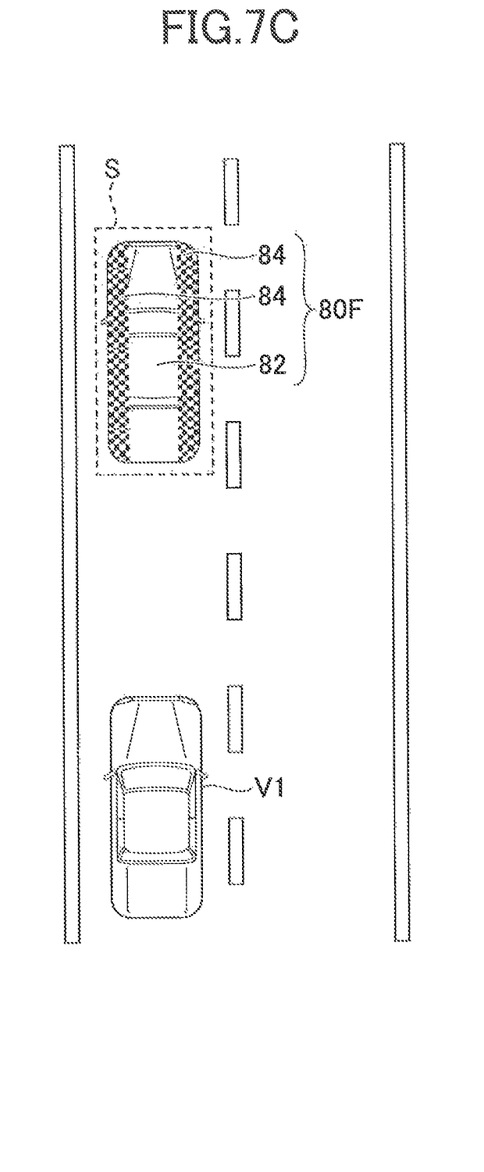
FIG. 7C is a diagram illustrating an example of a second image according to a control state of an intervention control in the case where the intervention control is an autonomous steering control.

FIGS. 7A through 7C are diagrams illustrating an example of the second image according to the control state of the intervention control in the case where the intervention control is the autonomous steering control.

The travel area image formation part 48 forms a second image SOD as illustrated in FIG. 7A when the control state is a lateral acceleration generation control (departure prevention support control) in the right direction. In the example illustrated in FIG. 7A, the featuring portion 84 extends in the front and rear direction such that the featuring portion 84 is superimposed on a right end portion of the silhouette portion 82. The featuring portion 84 is formed to have more than two rows in the lateral direction. The featuring portion 84 may be formed such that flashing is repeated on a row basis successively from the rightmost row to the left. At that time, the travel area image formation part 48 may change flashing speed such that the flashing speed increases as the intervention amount (a target acceleration in the right direction, for example) becomes greater. It is noted that the silhouette portion 82 is not flashed.

The travel area image formation part 48 forms a second image 80E as illustrated in FIG. 7B when the control state is the lateral acceleration generation control in the left direction. In the example illustrated in FIG. 7B, the featuring portion 84 extends in the front and rear direction such that the featuring portion 84 is superimposed on a left end portion of the silhouette portion 82. The featuring portion 84 is formed to have more than two rows in the lateral direction. The featuring portion 84 may be formed such that flashing is repeated on a row basis successively from the leftmost row to the right. At that time, the travel area image formation part 48 may change flashing speed such that the flashing speed increases as the intervention amount (the target acceleration in the left direction, for example) becomes greater. It is noted that the silhouette portion 82 is not flashed.

The travel area image formation part 48 forms a second image 80F as illustrated in FIG. 7C when the control state is a state in which the autonomous steering control is not performed or the intervention amount is small. In the example illustrated in FIG. 7C, the featuring portions 84 extend in the front and rear direction such that the featuring portions 84 are superimposed on the left end portion and the right end portion of the silhouette portion 82, respectively. The featuring portions 84 on the left and the right may be flashed simultaneously or may not be flashed. It is noted that the silhouette portion 82 is not flashed.

It is noted that in the example illustrated in FIGS. 7A through 7C, when the control state is the lateral acceleration generation control in the right direction, the featuring portion 84 is not superimposed on the left end portion of the silhouette portion 82; however, the featuring portions 84 may be superimposed on the left and right end portions of the silhouette portion 82, respectively. In this case, the travel area, image formation part 48 flashes only the featuring portion 84 on the right end portion of the silhouette portion 82 when the control state is the lateral acceleration generation control in the right direction. Similarly, in the example illustrated in FIGS. 7A through 7C, when the control state is the lateral acceleration generation control in the left direction, the featuring portion 84 is not superimposed on the right end portion of the silhouette portion 82; however, the featuring portions 84 may be superimposed on the left and right end portions of the silhouette portion 82, respectively. In this case, the travel area image formation part 48 flashes only the featuring portion 84 on the left end portion of the silhouette portion 82 when the control state is the lateral acceleration generation control in the left direction.

Figure 8:
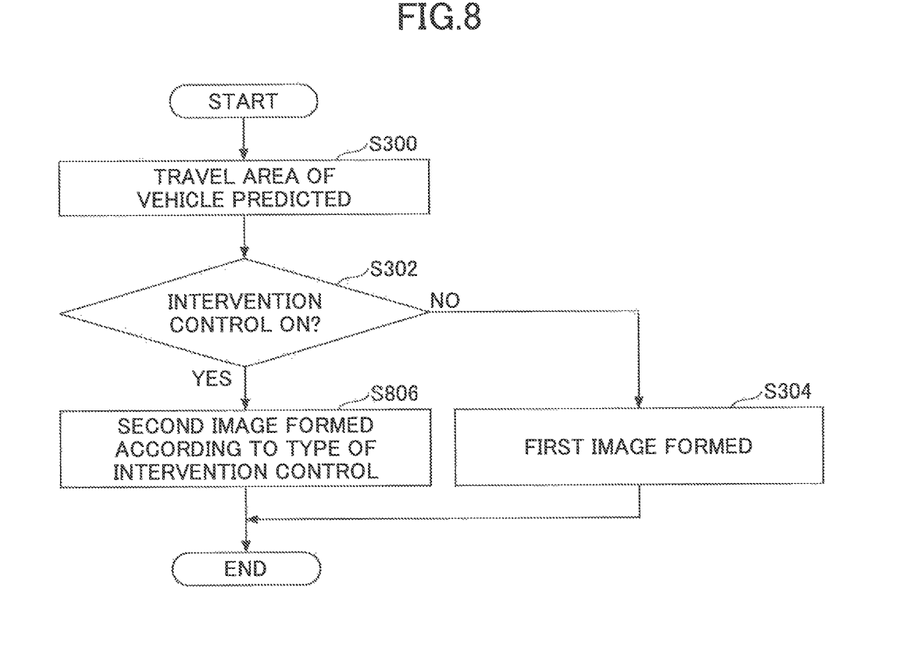
FIG. 8 is a flowchart of yet another example of a process executed by a control ECU 40.

FIG. 8 is yet another example of a flowchart of the process executed by the vehicle control ECU 40. The process illustrated in FIG. 8 may be initiated when an ignition switch of the vehicle is turned on, and then may be repeated at a predetermined cycle. Further, the process illustrated in FIG. 8 may be initiated under a condition that the head lamps 50 have been turned on.

The process illustrated in FIG. 8 differs from the process illustrated in FIG. 3 in that process of step S806 is performed instead of the process of step S306. In the following, only a different part is mainly described.

In step S806, the travel area image formation part 48 forms (renders) the second image according to the type of the intervention control that is in the on state, and projects the formed second image in the travel area with the projectors 52. The second image according to the type of the intervention control is arbitrary as long as it is different from the first image and varied according to the types of the intervention controls. For example, if the intervention control in the on state is the autonomous vehicle speed control, the travel area image formation part 48 may form at second image that differs from the second image 80C illustrated in FIG. 6C only in that the featuring portion 84 is net flashed. On the other hand, if the intervention control in the on state is the autonomous steering control, the travel area image formation part 48 may form a second image that differs from the second image 80F illustrated in FIG. 7C only in that the featuring portion 84 is not flashed. It is noted that if the autonomous vehicle speed control and the autonomous steering control are in the on state, the travel area image formation part 48 may superimpose the featuring portions 84 on the front, rear, left, and right end portions of the silhouette portion 82, respectively.

According to the process illustrated in FIG. 8, the image indicative of the control state of the vehicle (the type of the intervention control in the on state) can be projected. With this arrangement, the driver can recognize the type of the intervention control in the on state while keeping the line of sight ahead. Further, drivers of surrounding vehicles, pedestrians, etc., who see the projected image can also recognize the control state of the vehicle.

It is noted that the process of step S304 may be omitted in the process routine illustrated in FIG. 8. Such a variant is suited for the case where the head lamps 50 are in the off state, for example.

Figure 9:
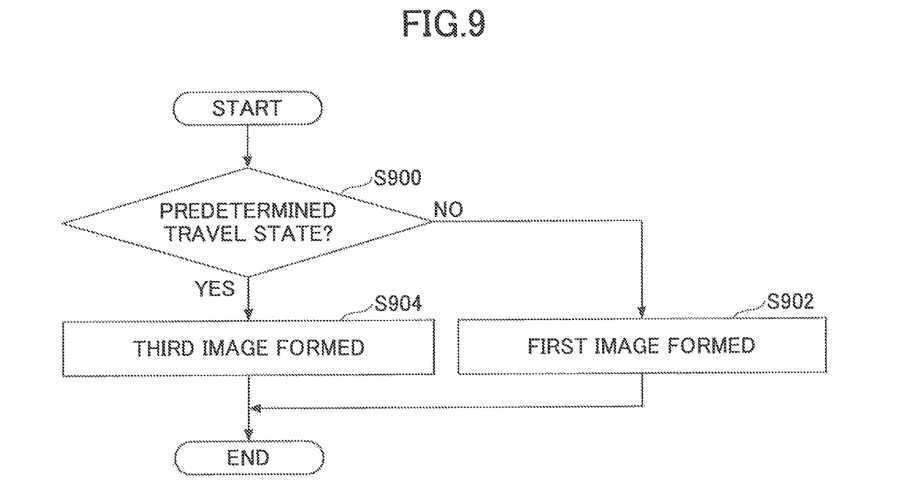
FIG. 9 is a flowchart of another example of a process of step S304.

FIG. 9 is a flowchart of another example of the process of step S304. The process illustrated in FIG. 9 may be adopted in FIGS. 3, 5 and 8. Alternatively, the process illustrated in FIG. 9 may be performed in the vehicle in which the autonomous vehicle speed control and the autonomous steering control are not performed.

In step S900, the travel state determination part 47 determines whether the current travel state is a predetermined travel state. The predetermined travel state is an arbitrary state that may be useful to be reported to the driver. The predetermined travel state may include at least any of an acceleration state, a deceleration state (including a deceleration state for emergency stop), a right turning state and a left turning state (an operation state of power steering, a generation state of assist torque and a direction of the assist torque, etc.), for example. If the current travel state is the predetermined travel state, the process routine goes to step 904, otherwise the process routine goes to step 902.

In step S902, the travel area image formation part 48 forms (renders) a first image, and projects the formed first image in the travel area with the projectors 52. The first image is arbitrary; however, the first image may be an image that merely brightens the travel area S as a whole as illustrated in FIG. 4, for example. Alternatively, the first image may be an image 72 of a silhouette of the vehicle rendered in the travel area 8 as illustrated in FIG. 4, for example.

In step S904, the travel area image formation part 48 forms (renders) a third image according to the predetermined travel state, and projects the formed third image in the travel area with the projectors 52. The third image according to the predetermined travel state is arbitrary as long as it is different from the first image. When the predetermined travel state includes only one travel state, the third image may be any image different from the first image. Further, when the predetermined travel state includes a plurality of travel states, the third image is arbitrary as long as it is different from the first image and different between the travel states. For example, when the predetermined travel state is the acceleration state, the third image may be the same as the second image 80A illustrated in FIG. 6A. Further, when the predetermined travel state is the deceleration state, the third image may be the same as the second image 80B illustrated in FIG. 6B. Further, when the predetermined travel state is the deceleration state for emergency stop, the third image may be formed by flashing the featuring portion 84 in the second image 80C illustrated in FIG. 6C at high speed. Further, when the predetermined travel state is the right turning state, the third image may be the same as the second image 80D illustrated in FIG. 7A. Further, when the predetermined travel state is the left turning state, the third, image may be the same as the second image 80E illustrated in FIG. 7B.

According to the process illustrated in FIG. 9, the image indicative of the travel state of the vehicle can be projected. With this arrangement, the driver can recognize the travel state of the vehicle while keeping the line of sight ahead. Further, drivers of surrounding vehicles, pedestrians, etc., who see the projected image can also recognize the travel state of the vehicle.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions nave been described in detail, it should be understood that the various changes, substitutions, and alterations could be made hereto without departing from, the spirit and scope of the invention. Further, all or part of the components of the embodiments described, above can be combined.

For example, according to the embodiment described above, the featuring portion 84 is the checkered pattern to be featured with respect to the silhouette portion 82, which increases information transmission capability by the featuring portion 84. However, the featuring portion 84 may be formed in arbitrary ways. For example, the featuring portion 84 may be formed by a portion of the silhouette portion 82 whose illuminance is enhanced with respect to a neighboring portion, or may be formed by a portion illuminated in different color (red, for example) with respect to the neighboring portion.

Further, according to the embodiment, the projectors 52 are integrally incorporated in the head lamps 50; however, the projectors 52 may be provided outside of the head lamps 50. Further, the projectors 52 may include two or more projectors which include a first projector that projects the silhouette portion 82 and a second projector that projects the featuring portion 84.

Further, in the embodiment described above, the projectors 52 may be of any types. For example, the projector 52 may be of such a projector type (mirror element projector type) that uses micro mirror elements. In this case, the projector 52 includes a lamp as a light source, a mirror device, and a lens for focusing the light from the mirror device. The mirror device includes a number of micro mirror elements arranged therein for controlling reflection directions of the light from the lamp. The micro mirror elements in the mirror device can mechanically change inclination angles according to electrical inputs. Thus, the incident light components to the respective micro mirror elements are selectively subject to modulation (shaded, reduced, etc.,) for the reflection directions according to the inclination angles of the respective micro mirror elements that can be selectively changed. Alternatively, the projector 52 may be of a liquid crystal projector type. In this case, the projector 52 includes a lamp as a light source, a liquid crystal panel, and a lens for imagining the light passing through the liquid crystal panel. The liquid crystal panel includes a number of liquid crystal, elements arranged therein for controlling transmission of the light from the lamp. The reflection/transmission states of the incident light components from the light source can be changed by changing voltages applied to the respective liquid crystal elements in the liquid crystal panel. Thus, the light components from the light source can be reduced or shielded by differentiating the voltages applied to the respective liquid crystal elements. Alternatively, the projector 52 may be of a LED matrix type. In this case, the projectors 52 includes an LED array in which a number of LED chips are arranged and a number of lenses for focusing the light from the LED array. The light amounts of the respective LED chips can be differentiated by changing current values or current supply duration times for the respective LED chips.

Further, according to the embodiment, in step S300, the control state determination part 46 determines whether the autonomous vehicle speed control and the autonomous steering control are in the on state; however, in the case where only one of the autonomous vehicle speed control and the autonomous steering control is executable, the determination may be performed with respect to one of them. Such a configuration can be applied to processes other than the process routine illustrated in FIG. 8, in particular.

The present application is based on and claims the benefit of priority of Japanese Priority Application No. 2014-126521, filed on Jun. 19, 2014, the entire contents of which are hereby incorporated by reference.

DESCRIPTION OF REFERENCE SYMBOLS 1 illumination apparatus for a vehicle
30 vehicle speed sensor
32 steering sensor
40 control ECU
50 head lamp
52 projector

The invention claimed is:

1. An illumination apparatus for a vehicle, the illumination apparatus comprising:
a projector configured to project an image of visible light; and
a processing apparatus configured to predict a travel area of the vehicle after a predetermined time or a predetermined distance of travel, and project an image in the predicted travel area with the projector for illumination of the travel area, the image being indicative of a travel state of the vehicle or a control state of the vehicle, wherein the processing apparatus projects the image indicative of the control state of the intervention control with the projector, wherein the intervention control includes an autonomous vehicle speed control, and the processing apparatus projects, in an acceleration control state, the image such that only a front end portion of the image is flashed, and projects, in a deceleration control state, the image such that only a rear end portion of the image is flashed, and wherein front and rear directions of the image are defined with respect to the image on a road surface viewed from the vehicle side.

2. An illumination apparatus for a vehicle, the illumination apparatus comprising:
a projector configured to project an image of visible light; and
a processing apparatus configured to predict a travel area of the vehicle after a predetermined time or a predetermined distance of travel, and project an image in the predicted travel area with the projector for illumination of the travel area, the image being indicative of a travel state of the vehicle or a control state of the vehicle, wherein the processing apparatus projects the image indicative of the control state of the intervention control with the projector, wherein the intervention control includes an autonomous steering control, wherein the processing apparatus projects, in a steering control state in a right direction with an intervention amount greater than or equal to a predetermined value, the image such that only a right portion of the image is flashed, and projects, in a steering control state in a left direction with an intervention amount greater than or equal to a predetermined value, the image such that only a left portion of the image is flashed, and wherein left and right directions of the image are defined with respect to the image on a road surface viewed from the vehicle side.

3. The illumination apparatus for a vehicle of claim 1, wherein the processing apparatus projects different images with the projector between a state in which an intervention control to be performed regardless of a driver operation is executable and a state in which the intervention control is not executable.

* * * * *